United States Patent [19]
Hunt et al.
[11] 3,750,797
[45] Aug. 7, 1973
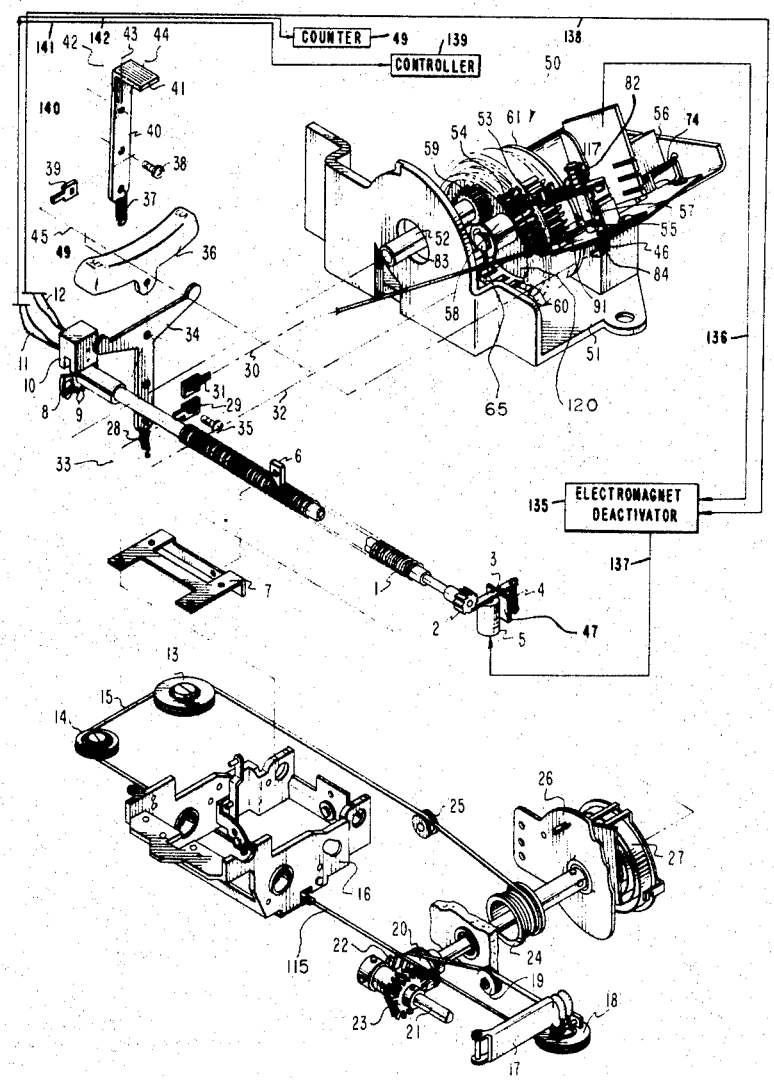

INVENTORS
RONALD E. HUNT
JOSEPH S. MORGAN

ATTORNEY 3,750,797

CARRIER POSITIONING AND TABULATION APPARATUS

BACKGROUND OF THE INVENTION

1. Field of the Invention

This invention generally relates to tabulation mechanisms, and more specifically, to an apparatus for 1) controlling the advance of a carrier during escapement and tabulation operations, and 2) generating signals indicative of the exact carrier position during such operations.

2. Description of Prior Art

Heretofore, there have been quite a number of mechanisms and methods dealing with carrier or carriage escapement and tabulations. With the majority of these the number of parts required and the expense associated therewith has been excessive. A primary disadvantage of the prior art devices is the expensive and complicated electronic means required for providing the operator with an indication of the carrier position during tabulation operations. The position of the carrier is important after tabulation positions have been set when the operator is attempting to locate the tabulation positions or perform tabulation operations. The mechanical devices usually provided for accomplishing these functions have not been very accurate, and therefore, electronic devices have been offered as a solution to this problem. Another disadvantage associated with the prior art devices is that separate escapement and tabulation mechanisms are normally used which result in added costs and complexity. This is highly undesirable in the typing and printer product lines which are extremely cost sensitive. Yet another disadvantage of many of the prior art devices is the inability to clear, at any time, all set tabulation positions.

SUMMARY OF THE INVENTION

Briefly, an apparatus is provided for controlling both escapement and tabulation where tabulation is directly related to escapement. The apparatus may be incorporated into a single print element typewriting machine having a carrier which advances selectively for printing of characters spacing, and tabulation. The apparatus is made up of a carrier, means for advancing and returning the carrier, a lead screw for controlling carrier advancement, an emitter wheel, a stop device, and a pin wheel. In this apparatus fewer parts are required than in traditional machanisms, since many of the parts are used for both escapement and tabulation. The mainspring and gear train for advancing and returning the carrier are also used during a tabulation operation, and the leadscrew is used not only to control advancement of the carrier, but to control tabulation. The structure associated with the leadscrew can affect escapement, tabulation, and the position of the carrier.

During tabulation, the carrier advances, a pin wheel rotates, and a signal is generated upon the sensing of a set pin indicating the approach of a tab position. When the next home emitter spoke is sensed, a signal is generated which will cause the leadscrew to stop rotating and stop the carrier at a set tabulation position.

The above described apparatus will become more readily understood when considered in conjunction with the remainder of the specification and accompanying drawing.

DESCRIPTION OF THE PREFERRED EMBODIMENT

In accordance with this invention, rotation of a leadscrew controls escapement of a carrier, determines the position of the carrier, and controls tabulation. Implementation of the apparatus may take a number of forms all well within the skill of those in the typewriting art. The carrier, main spring, leadscrew, pin wheel, and emitter wheel may be of the form of any conventional apparatus readily available.

Figure 1:
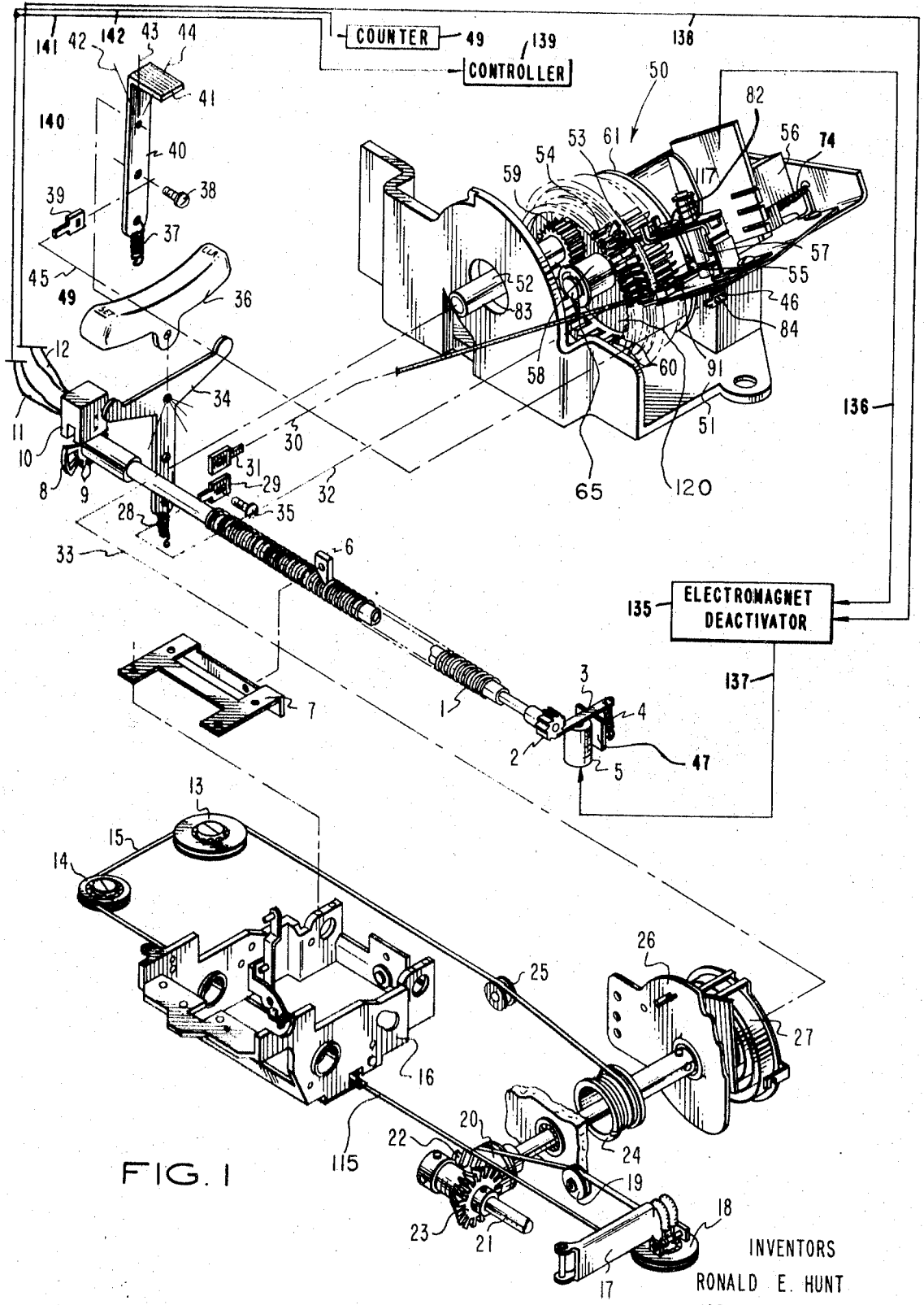
FIG. 1 is a perspective view of the typewriter escapement and tabulation apparatus according to this invention.

Referring to FIG. 1, there is shown a single print element carrier 16 which is driven in the left or return direction by cable 15 which follows a path around pulleys 14, 13, and over pulley 25 to windup block 24. Carrier 16 is driven to the right or in the advancing direction by cable 115 which follows a path around pulley 18, which is connected to cable tensioning arm 17, over pulley 19 and to windup block 20. Force applied to carrier 16 by cable 115 is supplied by main spring 27 maintained by mounting plate 26. In the return direction carrier 16 is moved by cable 15 by force transmitted through gears 22 and 23 by means of shaft 21 connected to a motor or other power means not shown. The transmission of power through shaft 21 will also effect windup of main spring 27.

Carrier 16 is driven, or impelled, to the right by main spring 27 and cable 115. Mounting bracket 7 carrying shoe 6 is secured to carrier 16 and with shoe 6 engaging the threads of leadscrew 1, carrier advancement is controlled by rotation of leadscrew 1 under the influence of a gear train and power means not shown. The return of carrier 16 to the left is accomplished as described above with shoe 6 pivoting and ratcheting over the threads of leadscrew 1.

Secured to the right end of leadscrew 1 is a ratchet gear 2 having associated therewith an armature 3 biased by spring 4 over fulcrum member 47. When rotation of leadscrew 1 is to be stopped, electromagnet 5 is deactivated permitting armature 3 to contact a lug on ratchet gear 2.

On the left end of leadscrew 1 is secured an emitter wheel having emitter spokes 9 and a home emitter spoke 8. Associated with the emitter wheel is a sensing device 10 for sensing the passage therethrough of emitter spokes 9 and home emitter spoke 8. Lead wires 12 carry pulses indicating the sensing of the home emitter spoke 8 and lead wires 11 carry pulses indicating the sensing of the emitter spokes 9.

Figure 2:
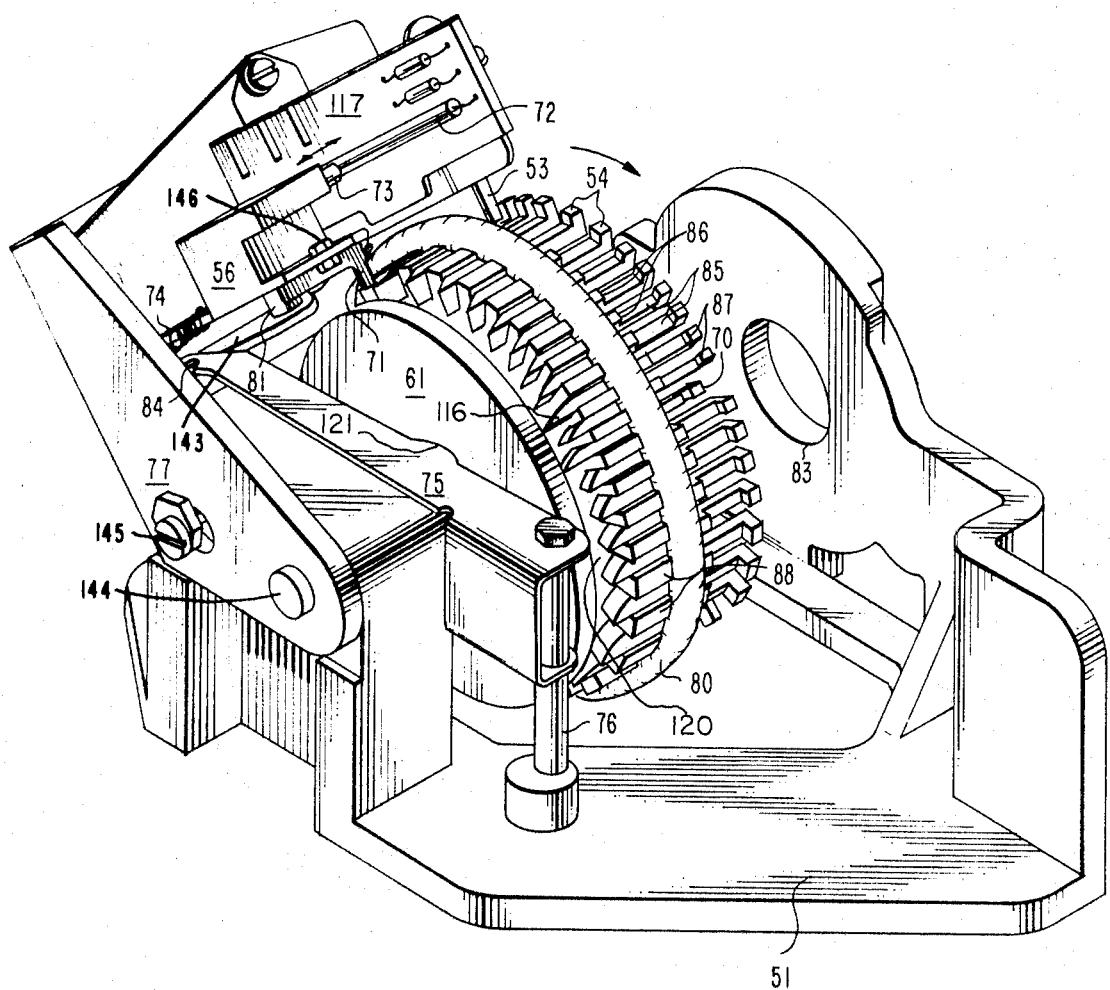
FIG. 2 is a perspective view from another angle showing a part of the tabulation mechanism according to this invention.

Referring now to both FIGS. 1 and 2, the tabulation mechanism making up part of the apparatus according to this invention is generally denoted by reference numeral 50 (FIG. 1). Maintained by frame 51 is a pin wheel 120 with teeth 88 having pins 54 therebetween maintained by spring band 80 or other suitable means. Pins 54 are provided with a channel defined by walls 86 and 87 and floors 85 for accepting pin setter 53 and allowing unrestricted passage thereof upon rotation of the pin wheel 120. The pin wheel 120 is rotated about rotatable tabulation means having settable pins for defining approaches to tabulation positions and rotatable synchronously with said advance of said carrier by said means for advancing said carrier;

means for setting at least one of said settable pins;

a first sensing means associated with said rotatable tabulation means operative to provide a first signal upon sensing a set one of said settable pins; and a second sensing means associated with said rotatable lead screw for sensing a tabulation position defined by said first signal and a multiple of said increments and operative to provide a second signal for operating said stopping means during tabulation for stopping said advance of said carrier at said tabulation position after the occurrence of said first signal and upon the sensing of a multiple of said increments.

2. An apparatus according to claim 1 wherein said tabulation means is comprised of a rotatable wheel having settable pins.

3. An apparatus according to claim 2 further including a clearing plate in operable association with said rotatable wheel for clearing all set pins simultaneously.

4. An apparatus according to claim 3 wherein said controlling means is comprised of a rotatable leadscrew and a shoe carried by said carrier engaging the threads of said leadscrew.

5. An apparatus according to claim 4 wherein said means for defining multiples is a home emitter spoke on an emitter wheel also having emitter spokes for defining increments of advance of said carrier.

* * * * *

United States Patent [19]
Hansen

[11] 3,750,798
[45] Aug. 7, 1973

[54] SUPPORT PAD FOR CONVEYOR CHAIN AND COMBINATION THEREOF WITH CONVEYOR CHAIN

[75] Inventor: Niels S. Hansen, Fort Wayne, Ind.
[73] Assignee: Foundation and Bridge Corp., Fort Wayne, Ind.
[22] Filed: May 12, 1971
[21] Appl. No.: 142,640

[52] U.S. Cl.................................. 198/1, 198/137
[51] Int. Cl............................................. B65g 15/00
[58] Field of Search.................... 198/137, 198, 127; 188/196 BA

[56] References Cited
UNITED STATES PATENTS

| | | | |
|---|---|---|---|
| 3,509,987 | 5/1970 | Flaith et al...................... | 198/137 X |
| 3,473,633 | 10/1969 | Hagerty......................... | 188/196 BA |
| 3,140,774 | 7/1964 | Johnston et al...................... | 198/137 |

*Primary Examiner*—Richard E. Aegerter
*Assistant Examiner*—Hadd S. Lane
*Attorney*—Jeffers and Rickert

[57] ABSTRACT

The specification discloses a conveyor chain running in a horizontal direction adjacent a stationary surface and a pad adapted for connection with the conveyor chain and slidable on the surface so as to hold the conveyor chain in spaced relation to the surface and eliminating wearing of the chain and surface.

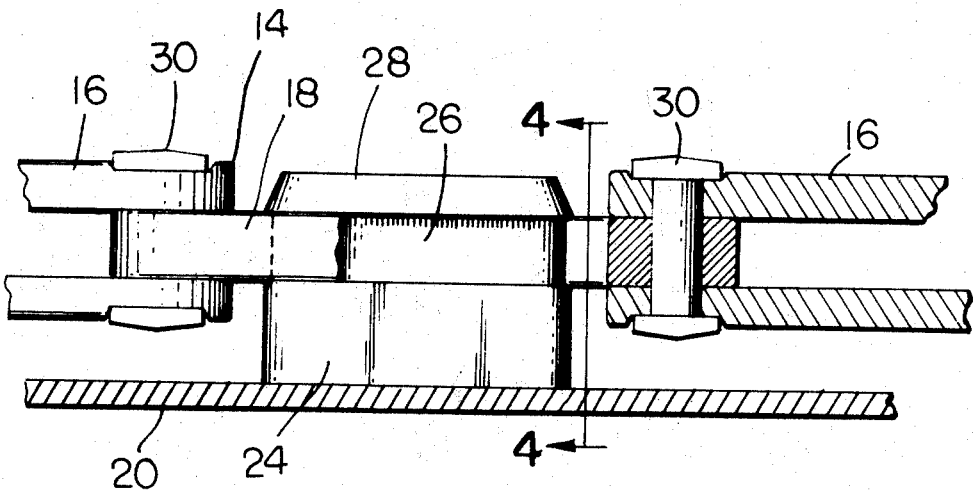

3 Claims, 4 Drawing Figures